US011512210B2

(12) United States Patent
Seol et al.

(10) Patent No.: US 11,512,210 B2
(45) Date of Patent: Nov. 29, 2022

(54) METHOD FOR 3D PRINTING OF CARBON NANOTUBE MICROSTRUCTURE HAVING HIGH CONDUCTIVITY, AND INK USED THEREIN

(71) Applicant: KOREA ELECTROTECHNOLOGY RESEARCH INSTITUTE, Changwon (KR)

(72) Inventors: Seung Kwon Seol, Namyangju (KR); Won Suk Chang, Seoul (KR)

(73) Assignee: KOREA ELECTROTECHNOLOGY RESEARCH INSTITUTE, Changwon (KR)

(*) Notice: Subject to any disclaimer, the term of this patent is extended or adjusted under 35 U.S.C. 154(b) by 839 days.

(21) Appl. No.: 16/319,258

(22) PCT Filed: Nov. 3, 2016

(86) PCT No.: PCT/KR2016/012553
§ 371 (c)(1),
(2) Date: Jan. 18, 2019

(87) PCT Pub. No.: WO2018/016680
PCT Pub. Date: Jan. 25, 2018

(65) Prior Publication Data
US 2019/0276688 A1    Sep. 12, 2019

(30) Foreign Application Priority Data

Jul. 21, 2016   (KR) .................. 10-2016-0092843

(51) Int. Cl.
*C09D 11/03*     (2014.01)
*B33Y 10/00*     (2015.01)
(Continued)

(52) U.S. Cl.
CPC ............ *C09D 11/03* (2013.01); *B29C 64/106* (2017.08); *B29C 67/00* (2013.01); *B33Y 10/00* (2014.12);
(Continued)

(58) Field of Classification Search
CPC . B29C 64/106; B33Y 10/00; B29K 2105/167; B29K 2507/04
See application file for complete search history.

(56) References Cited

U.S. PATENT DOCUMENTS

2015/0366073 A1* 12/2015 Magdassi .............. B29C 64/112
  264/494
2017/0236613 A1*  8/2017 Prestayko ............. C08K 3/041
  264/308
2018/0022023 A1*  1/2018 Therriault ............. C07C 19/03
  264/460

FOREIGN PATENT DOCUMENTS

JP       2010174084 A     8/2010
JP        201628887 A     3/2016
(Continued)

OTHER PUBLICATIONS

Giovanni Postiglione et al. "Conductive 3D microstructures by direct 3D printing of polymer/carbon nanotube nanocomposites via liquid deposition modeling," Composites Part A: Applied Science and Manufacturing, vol. 76, 2015, pp. 110-114. (Year: 2015).*
(Continued)

*Primary Examiner* — Niki Bakhtiari
*Assistant Examiner* — Inja Song

(57) ABSTRACT

A method of manufacturing a carbon nanotube (CNT) composite material structure is provided. The method includes providing ink, in which a CNT composite material including a CNT and a rheological modifier is dispersed, to a nozzle, positioning the nozzle at a predetermined point on a substrate, and moving the nozzle along a predetermined
(Continued)

path on the substrate while discharging the ink from the nozzle by surface tension of a meniscus formed at a leading end of the nozzle and printing a CNT composite material pattern corresponding to a movement path of the nozzle. In printing the CNT composite material pattern, the pattern is stacked as the CNT composite material by evaporation of a solvent within a meniscus formed by the ink extruded from the nozzle between the nozzle and the substrate.

14 Claims, 17 Drawing Sheets

(51) Int. Cl.
*B33Y 70/00* (2020.01)
*B29C 64/106* (2017.01)
*C09D 11/52* (2014.01)
*B29C 67/00* (2017.01)
*B29K 105/16* (2006.01)
*B29K 507/04* (2006.01)

(52) U.S. Cl.
CPC .............. *B33Y 70/00* (2014.12); *C09D 11/52* (2013.01); *B29K 2105/167* (2013.01); *B29K 2507/04* (2013.01)

(56) References Cited

FOREIGN PATENT DOCUMENTS

| KR | 1020160056485 A | 5/2016 |
| KR | 1020160063877 A | 6/2016 |
| WO | 2015191759 A1 | 12/2015 |

OTHER PUBLICATIONS

Yu et al. ("3D printing of Carbon Nanotubes-based Microsupercapacitors,"ACS Appl. Mater. Interfaces 2017, 9, 5, 4597-4604, Publication Date: Jan. 17, 2017) (Year: 2017).*

Giovanni Postiglione et al., "Conductive 3D microstructures by direct 3D printing of polymer/carbon nanotube nanocomposites via liquid deposition modeling", Composites, 2015, pp. 110-114, Elsevier Ltd.

International Search Report for PCT/KR2016/012553 dated Mar. 15, 2017.

Louis Laberge Lebel et al., "Ultraviolet-Assisted Direct-Write Fabrication of Carbon Nanotube/Polymer Nanocomposite Microcoils", Advanced Materials, 2010, pp. 592-596, Wiley-VCH.

* cited by examiner

METHOD FOR 3D PRINTING OF CARBON NANOTUBE MICROSTRUCTURE HAVING HIGH CONDUCTIVITY, AND INK USED THEREIN

CROSS-REFERENCE TO RELATED APPLICATION

This application is a U.S. National Stage of International Patent Application No. PCT/KR2016/012553, filed on Nov. 3, 2016, which claims priority of Korean Patent Application No. 10-2016-0092843, filed on Jul. 21, 2016, which is hereby incorporated by reference in its entirety.

TECHNICAL FIELD

The present invention relates to a method of printing a 3D structure, and more particularly, to a method of printing a 3D microstructure having high conductivity including a carbon nanotube, and an ink used therein and representing a fluid behavior.

BACKGROUND ART

A printed electronic technology has an advantage in that a desired shape is directly printed, so that a cheap circuit device may be rapidly manufactured on various substrates with a simple process, compared to the existing complex and high-cost photolithography.

The printed electronic technology includes a three-dimensional (3D) printing method, which is capable of manufacturing a 3D pattern, in addition to a method of manufacturing an electronic device by a scheme of scanning, copying, and outputting a two-dimensional (2D) plane object. The 3D printing technology may shape n plastic (such as rubber, nylon, and so on) and a metal (such as stainless steel, titanium, and so on), and the like to a real-sized model, a prototype, a tool, a component, and the like based on 3D design data by an additive manufacturing method. The 2D and 3D printing technologies serve as catalysts of growing the printed electronic field, which is limitedly applied to partial areas, such as a circuit of a printed circuit board, a photomask of a semiconductor, and a color filter of a display, in the past, to a new area according to the development and the convergence of various inks, substrate materials, and a fine printing technology.

However, the existing 3D printing technology, such as Fused Deposit Modelling (FDM), and Selective Laser Sintering (SLS), has a limit to be applied to the printed electronic technology, in which a fine functional pattern needs to be implemented with various functional materials, due to process elements arising from a manufacturing method or a limit of a used raw material.

In the meantime, a carbon nanotube (hereinafter, a "CNT") is attractive electronic materials having good thermal, electrical, and mechanical characteristics, and chemical stability, and there is a demand for manufacturing a 3D structure of the CNT and applying the 3D structure to the 3D printed electronic technology.

In conventional 3D printing technologies, the printed 3D structure is composed of a polymer as a main component and a tiny amount of CNT as functional additives. For example, when the general FDM technology is applied, a desired 3D structure is formed by melting and injecting a polymer filament, to which a tiny amount of CNT of less than 3 wt % is added. In this case, the manufactured CNT/polymer filament has specific surface resistance of $10^9 \Omega$. When a content of CNT is increased for improving conductivity, there is a problem in that it is difficult to manufacture a filament for 3D printing.

Therriault et al., manufactured a 3D coil by using a polyurethane ink containing CNT of 0.5 wt % and silica of 5 wt %, which are hardened through UV emission, but conductivity of a structure manufactured in this case is $10'S\ m^{-1}$. Recently, Griffin et al., presented a technology of manufacturing a 3D structure by extruding a CNT/polymer composite material in a solution state. In this technology, the CNT/polymer composite material is dispersed in a volatile solvent, and the solution has high viscosity and represents a behavior in which a flow behavior is changed to a solid-like state (solid-like behavior) and a liquid-like state (liquid-like behavior) according to a size of distortional stress. Further, when viscosity of the solution is increased, larger applied pressure is required for material extrusion, so that in this method, CNT of a maximum of about 10 wt % with respect to a content of the CNT/polymer composite material is used. In this case, the fabricated structure has conductivity of 100 $S\ m^{-1}$. As described above, despite of the existing various attempts, a development of a 3D structure, which uses CNTs as a main component and has high conductivity, and a manufacturing technology of the 3D structure are not available up to now.

DISCLOSURE

Technical Problem

In order to solve the foregoing problems in the related art, the present invention aims to provide a manufacturing method based on an ink, which is capable of manufacturing a carbon nanotube (CNT) 3-dimensional (3D) structure that is appropriate to be applied to a printed electronic technology.

Further, the present invention aims to provide a method of manufacturing a 3D structure, in which a CNT is substantially used as a main component.

Further, the present invention aims to provide an ink composition appropriate to the manufacturing of the CNT structure.

Technical Solution

In order to achieve the technical objects, the present invention provides a method of manufacturing a CNT composite material structure, the method including: providing ink, in which a carbon nanotube (CNT) composite material including a CNT and a flow control agent is dispersed, to a nozzle; positioning the nozzle at a predetermined point on a substrate; and moving the nozzle along a predetermined path on the substrate while discharging the ink from the nozzle and printing a CNT composite material pattern corresponding to a movement path of the nozzle, in which in the printing of the CNT composite material pattern, the pattern is stacked as the CNT composite material by evaporation of a solvent from a meniscus formed by the ink extruded from the nozzle between the nozzle and the substrate.

In the exemplary embodiment of the present invention, the flow control agent may form a hydrophilic ring surrounding a surface of the CNT.

Further, in the exemplary embodiment of the present invention, a concentration of the CNT composite material in the ink may be 6 to 60 wt %, and preferably, 22 to 35 wt %. Further, a concentration of the CNT in the ink may be 1 to 20 wt %, and preferably, 5 to 10 wt %. Further, a concentration of the flow control agent may be 5 to 40 wt %, preferably, 10 to 25 wt %, and more preferably, 17 to 25 wt %.

Further, in the present invention, as the flow control agent, a hydrophilic polymer may be used. For example, the rheological modifier may include a minimum of one kind of polymer selected from the group consisting of polyvinyl pyrrolidone (PVP), polyethylene glycol (PEG), and polyacrylic acid (PAA).

Further, the present invention may further include removing a minimal part of the rheological modifier in the stacked CNT composite materials after the printing.

In the present invention, after the removal, the CNT of 50 wt % or more, preferably, 70 wt % or more, may be contained in the CNT composite material.

In the present invention, the solvent may be a minimum of one kind selected from the polar solvent group consisting of water, alcohol, acetone, and dichloromethane.

According to another aspect of the present invention, the present invention provides carbon nanotube (CNT) ink including a CNT, a rheological modifier for controlling a flow of the CNT, and a solvent, in which the ink exhibits a liquid-like behavior under shear stress of $10^{-1}$ to 10 Pa.

In the exemplary embodiment of the present invention, a loss modulus of the ink may have a larger value than that of storage modulus under shear stress of $10^{-1}$ to 10 Pa. In this case, a content of the CNT may be 5 to 10 wt %. Further, a content of the flow control agent in the ink may be 10 to 25 wt %, and preferably, 17 to 25 wt %.

Further, a weight ratio of the CNT and the flow control agent in the ink may be 1:1 to 1:5.

Advantageous Effects

According to the present invention, it is possible to provide a method of manufacturing a CNT structure, in which a 3D structure is printed by a printing scheme.

Further, according to the present invention, it is possible to prepare a CNT structure, in which a carbon nanotube (CNT) is used as a main component.

Further, according to the present invention, it is possible to mold a continuous pattern by a pressureless scheme without clogging of a nozzle or interruption of an ink, and a prepared CNT structure firmly maintains an injected shape.

Particularly, the present invention may be applied to a printed electronic technology and be applied to the implementation of various component devices including an active device and a passive device.

Further, according to another aspect of the present invention, the present invention may provide a CNT ink appropriate to 3D printing of a pressureless extrusion scheme.

The present invention enables a 2D or 3D pattern having high solution to be formed, compared to pressure extrusion molding.

BEST MODE

In the foregoing, an exemplary embodiment of the present invention has been described, but the exemplary embodiment illustrates the present invention and does not limit the present invention.

A term used in the specification of the present invention is used as a general meaning of the term. However, a term specially defined in the present specification is used as the definition thereof. In the present invention, a pattern is a structure functioning as an electric and electronic device, and includes a three-dimensional (3D) structure, as well as a two-dimensional (2D) structure, and includes all of the structures, for example, a structure stacked in a direction parallel to a surface of a substrate or a structure in the form of a wire extended in a vertical direction to a substrate.

Figure 1:
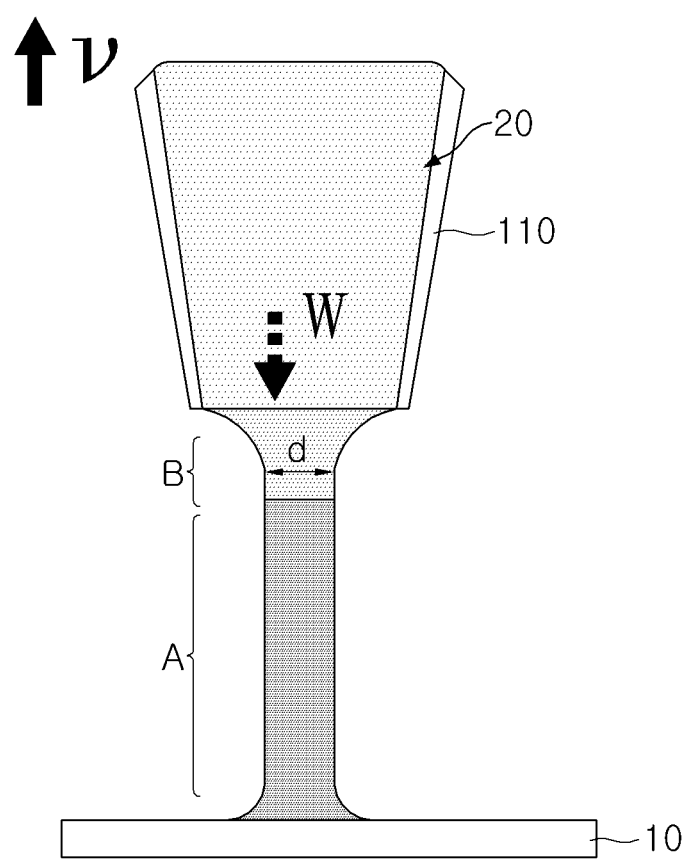
FIG. 1 is a diagram schematically illustrating a printing technology according to an exemplary embodiment of the present invention.

FIG. 1 is a diagram schematically illustrating a printing technology according to an exemplary embodiment of the present invention. Referring to FIG. 1, a carbon nanotube (CNT) ink, in which CNTs and a polymer (a rheological modifier) are dispersed at a predetermined concentration, is maintained in a printing pen 110. The printing pen 110 is in contact with a substrate 10 and the pen 110 moves in a specific direction, for example, a vertical direction, from a contact point at a predetermined speed v, so that the ink is extruded to a nozzle of a leading end of the pen with a predetermined flow amount W.

The ink extruded in the vicinity of nozzle of the leading end of the pen forms a meniscus B by surface tension. A solvent of the ink is momentarily evaporated from a surface of the meniscus, and as a result, a pure CNT/polymer stacked structure A remains on the substrate. According to the movement of the printing pen 110 in an upper direction, the surface tension by the meniscus B formed at the leading end of the nozzle enables the solution to be extruded to the outside of the nozzle without interruption. By the scheme, the solution within the nozzle is continuously extruded according to the movement of the nozzle, and a continuous process, in which the CNT/polymer stacked structure A is printed on an evaporation region close to the substrate, and the meniscus B is formed at the nozzle side, is generated.

As a result, a predetermined CNT composite material stacked pattern corresponding to a movement trace of the nozzle may be printed on the substrate.

Figure 2A:
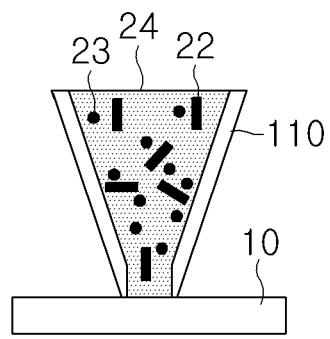
FIG. 2A to FIG. 2C are conceptual diagrams illustrating an operation process of a printing pen 110 for printing a carbon nanotube (CNT) pattern according to the exemplary embodiment of the present invention in more detail.
Figure 2B:
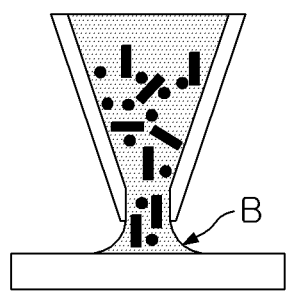
Figure 2C:
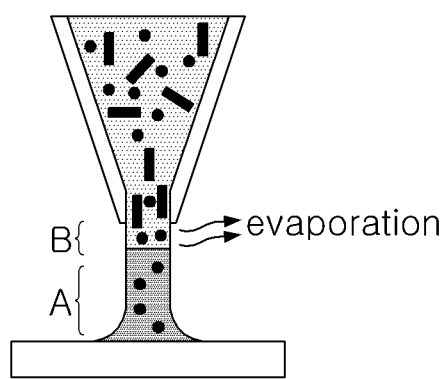

FIG. 2A to FIG. 2C are conceptual diagrams illustrating an operation process of the printing pen 110 for printing a CNT pattern according to the exemplary embodiment of the present invention in more detail.

FIG. 2A illustrates an initial state, in which the nozzle of the pen 110 is in contact with the substrate 10 and a nozzle. An ink including a CNT 22, a rheological modifier 23, and a solvent 24 is stored inside the pen 110.

As illustrated in FIG. 2B, when the pen 110 moves in the upper direction by a predetermined interval from the state of FIG. 2A, the meniscus B of the ink is formed in a gap between the nozzle and the substrate.

Next, as illustrated in FIG. 2C, when the pen 110 moves in the upper direction at a predetermined speed in this state, the ink is extruded from the nozzle. The meniscus B, in which surface tension by the ink in the solution state is applied, is formed at the nozzle side, the CNT composite material stacked structure A is formed at the substrate side by an evaporation of the solvent 24 by the scheme described in relation to FIG. 1. In the present invention, the meniscus acts as a pipe channel for the flow of the CNT. The CNT particles 22 flow to the outside of the nozzle along the pipe channel formed by the meniscus.

In the present invention, the solvent of the meniscus B has a high specific surface area, so that the solvent voluntarily evaporates even at a room temperature. As a matter of course, the present invention does not exclude an addition of an appropriate heating means to the operation process of the pen depending on the case. In the present invention, the forming of the meniscus and the evaporation of the solvent are generated almost at the same time, and as a result, a shape of the CNT composite material pattern is maintained.

In the present invention, a width of the meniscus is maintained within an appropriate range so as to provide a high specific surface area for evaporating the solvent. In the present invention, the width of the meniscus depends on an aperture of the nozzle and a movement speed of the nozzle. Further, the CNT flows within the pipe channel of the meniscus, so that a line width of the resultant CNT composite material pattern has the same value as or a smaller value than a value of a width d of the meniscus.

Referring back to FIG. 1, the meniscus has the width d having a predetermined size at a predetermined movement speed v. However, when the movement speed is increased, the width of the meniscus has a smaller value. The relation may be expressed by an equation below, which is called a so-called material balance law.

$$r=[W(v)/(\pi v)]^{1/2}$$

(herein, r is a radius of the meniscus, v is a movement speed of the nozzle, and W is a flow speed of the ink).

In the meantime, the rheological modifier of the CNT composite material pattern printed by the method of the present invention may be removed by an appropriate scheme. For example, the rheological modifier may be removed by a heat treatment process at a vacuum or non-oxidizing atmosphere. The heat treatment temperature and time may be appropriately designed in consideration of a device printed on the substrate, heat resistance of a neighboring device, and the like.

In the meantime, the printing method of the present invention is applicable to various forms of pattern.

Figure 3A:
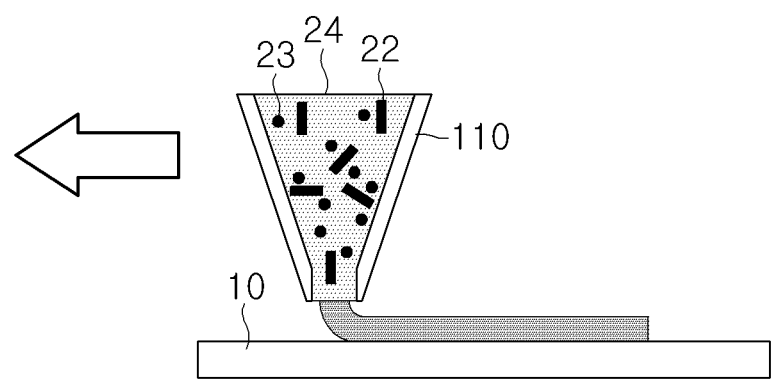
FIG. 3A and FIG. 3B are diagrams illustrating an example of a pattern printing method according to the exemplary embodiment of the present invention.
Figure 3B:
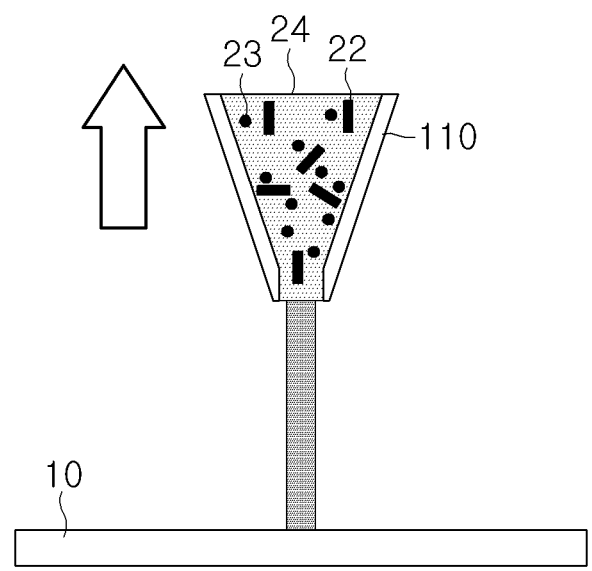

FIG. 3A and FIG. 3B are diagrams illustrating an example of the pattern printing method according to the exemplary embodiment of the present invention.

Referring to FIG. 3A, the printing pen 110 may move in a parallel direction to a substrate. Even in this case, the local forming of a meniscus, the evaporation of a solution, and the manufacturing of a CNT pattern may be progressed by the same mechanism as the foregoing mechanism. Further, the pattern may be applied to the printing of a pattern in a shape of a 2D plane.

Further, referring to FIG. 3B, the printing pen 110 moves in a vertical direction to the substrate, so that a freestanding wire pattern may be prepared in the vertical direction to the substrate.

Further, those skilled in the art will appreciate that a wire bonding is available in a 3D space by appropriately combining the two-directional movements.

Figure 4:
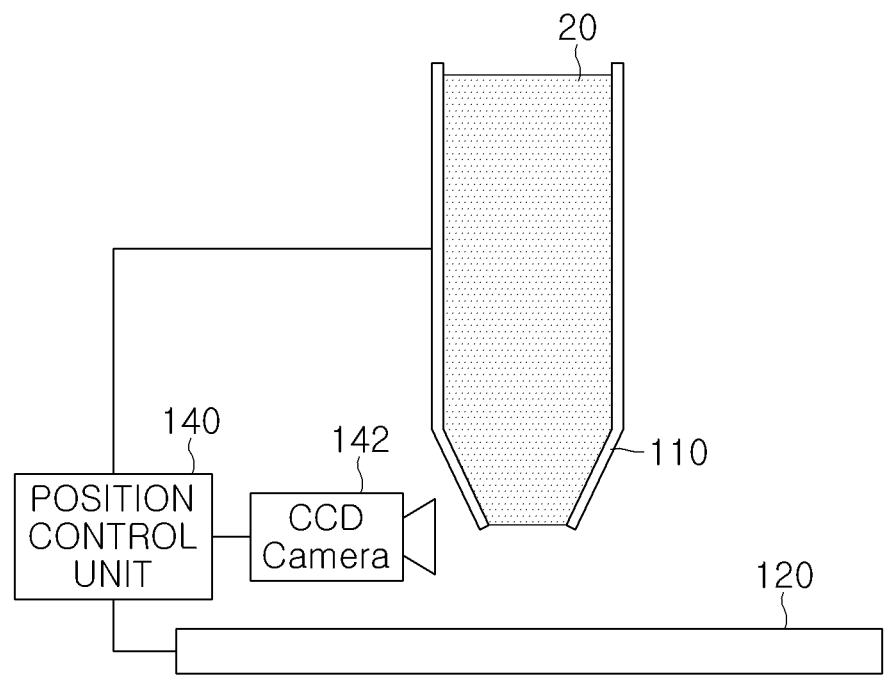
FIG. 4 is a diagram schematically illustrating a printing device according to an exemplary embodiment of the present invention.

FIG. 4 is a diagram schematically illustrating a CNT composite material pattern printing device according to an exemplary embodiment of the present invention.

Referring to FIG. 4, a CNT composite material pattern printing device 100 of the present invention may include a printing pen 110, a substrate stage 120, and a position control unit 140.

The printing pen 110 has a storage space containing a CNT composite material ink 20 therein, and extrudes the CNT composite material ink 20 through a nozzle provided at a leading end portion. In the present invention, a cross-section of the nozzle of the printing pen 110 may have various forms, such as a circular shape, a quadrangular shape, and a hexagonal shape.

In the present invention, the nozzle has a predetermined aperture. As described above, a line width of the pattern printed by the movement of the nozzle depends on a movement speed of the nozzle. Accordingly, in order to obtain a pattern having a nano size, an aperture having the nano size is not required. Preferably, an aperture of the nozzle in the present invention may be 0.1 μm to 50 μm. When the aperture of the nozzle is 50 μm or more, a specific surface area of the formed meniscus is small, so that it is not easy to print a stacked structure. Further, when the aperture of the nozzle is less than 0.1 μm, the nozzle may be clogged.

An ink supply tank (not illustrated) and an ink supply valve (not illustrated) may be connected to the printing pen 110. The ink supply valve may control a flow of the ink flowing into the printing pen 110. Further, the printing pen 110 may be attached to a feeding mechanism, for example, a feeding arm, for three-axis directional feeding, and the feeding arm may feed the printing pen 110 in the directions of X, Y, and Z axes.

The substrate stage 110 may be provided with all of the means for maintaining a substrate, which is a printed target. The substrate stage 120 may be provided with a feeding mechanism (not illustrated) movable in the three axial directions.

Further, the position control unit 140 controls a position of at least one of the printing pen 110 and the substrate stage 120. To this end, the position control unit 140 may control 3D relative positions of the printing pen 110 and the substrate stage 120 by driving the feeding mechanisms of the printing pen 110 and the substrate stage 120.

Further, the position control unit 140 controls a relative movement speed of the printing pen 110 to the substrate. In the present invention, a movement speed of the nozzle for printing the pattern is designed in consideration of a solution evaporation speed within the meniscus and surface tension of the solution. When water, ethanol, or acetone is used as a solvent, a movement speed of the nozzle may be the range of 0.1 μm/sec to 200 μm/sec. At the movement speed of less than 0.1 μm/sec, the nozzle is clogged due to the rapid evaporation, and at the movement speed of 200 μm/sec or more, the pattern is cut.

As a matter of course, in the present invention, the position control unit 120 may also control a position of the printing pen 110 and/or a substrate holder 120 by referring to a shape of a unit structure obtained through a CCD camera 142. In this case, the position control unit 140 may adjust a grow direction of the structure by controlling a shape of the meniscus 113 formed between the printing pen 110 and the substrate 120.

In the present invention, the ink supplied as a raw material of the CNT composite material pattern printing device 100 may have the characteristic below.

The ink includes a CNT 22, a polymer 23 as the rheological modifier, and a solvent (or a dispersion medium) 24.

The CNT may be particles or powder of a Single wall CNT (SWNT), a Multi wall CNT (MWNT), or a combination thereof.

The CNT represents a strong coagulation characteristic by Van der Waals force within the solution. In order to suppress the coagulation characteristic, a functional group, such as a carboxyl group (—COOH) and a hydroxyl group (—OH), may be introduced to a surface of the CNT by an acidic treatment and the like. However, the treatment cannot guarantee a continuous flow of the individual CNT through the nozzle.

Because of the reason, a rheological modifier is introduced to the ink of the present invention. The rheological modifier suppresses the coagulation of the CNT and induces uniform dispersion. By the rheological modifier, the CNT may flow through the nozzle without interruption.

In the present invention, the rheological modifier may be a hydrophilic polymer. Further, the hydrophilic polymer may be a hydrophilic polymer. For example, as the rheological modifier, a minimum of one kind of polymer selected from the group consisting of polyvinyl pyrrolidone (PVP), polyacrylic acid (PAA), and polyethylene glycol (PEG) may be used.

The rheological modifier is stuck to a surface of the CNT to be attached to the surface of the CNT or wrap the surface of the CNT.

Figure 5:
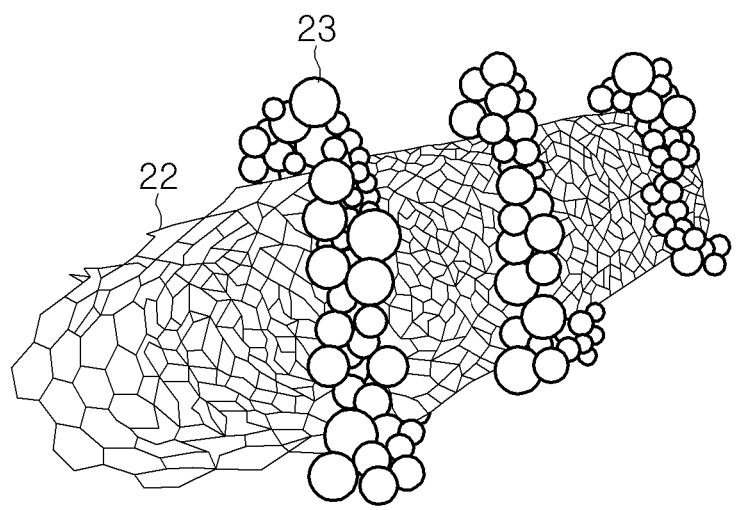
FIG. 5 is a diagram schematically illustrating a form, in which a rheological modifier surrounds a surface of a CNT in a CNT ink of the present invention.

FIG. 5 is a diagram schematically illustrating a form, in which the rheological modifier 23 surrounds the surface of the CNT 22. As described above, the hydrophilic rheological modifier 23 forms a water soluble ring while surrounding the surface of the CNT, and thus, the individual CNTs may be uniformly dispersed within the solution (water).

In the present invention, it is preferable that the solvent does not generate a residue after evaporation. In the present invention, as the solvent, an inorganic solvent or an organic solvent having polarity may be used. Preferably, water may be used as the inorganic solvent, and alcohol, dichloromethane, and acetone may be used as the organic solvent. Further, in the present invention, the evaporation of the solvent and the printing of the pattern need to be substantially performed in situ. Accordingly, in the present invention, a boiling point of the solvent may be the same as or lower than that of water, and may be 100° C. or lower.

In the present invention, when a content of rheological modifier is increased, viscosity of the ink is increased. Further, the ink represents a shear thinning characteristic, in which viscosity is decreased according to an increase in shear stress. Further, in the present invention, the ink represents a liquid-like behavior during shear stress. That is, a loss moduli G" has a larger value than that of a storage moduli G' under the shear stress.

MODE FOR CARRYING OUT THE INVENTION

Hereinafter, illustrative Examples of the present invention will be described.

<Preparation Example of CNT Composite Material Ink>

MWNT (Iljin Nanotech) and PVP (Aldrich) having molecular weight (Mw) of 10,000 were used as an ink raw material.

MWNT was dispersed in a mixture of enriched $H_2SO_4$ and $HNO_3$ (volume ratio: 3:1) and acidized by performing a heat treatment at 70° C. for 24 hours. The acidized MWNT was washed in heavy water several times and dried by using a dry oven at 100° C. for 24 hours.

Ink having different compositions was prepared by weighing MWNT and PVP so that MWNT of 7 wt %, and PVP of each concentration of 0 wt %, 7 wt %, 17 wt %, and 25 wt % are included with respect to the total weight of ink, and dispersing the weighed MWNT and PVP in water by using water as a solvent.

A rheological characteristic of the prepared ink was measured by using a rheometer (MCR102, Anton Paar). In order to measure viscosity of the ink, strain was continuously changed in the range of 10 to $10^2$ in order to measure viscosity at a changed shear rate. In order to obtain a storage modulus and a loss modulus with a function of stress, stress was continuously changed at a predetermined frequency of 1 Hz.

Further, in order to measure a decrease in mass of the MWNT and the PVP, a thermo gravimetric analysis was performed by using a thermo gravimetric analysis instrument (TA Instruments Q600, USA). For the thermo gravimetric analysis, a temperature of a sample was increased to 450° C. in an alumina crucible at a temperature increasing speed of 10° C./min, and then was maintained in an Ar atmosphere (a flow rate of 100 ml/min) for 1 hour.

Figure 6A:
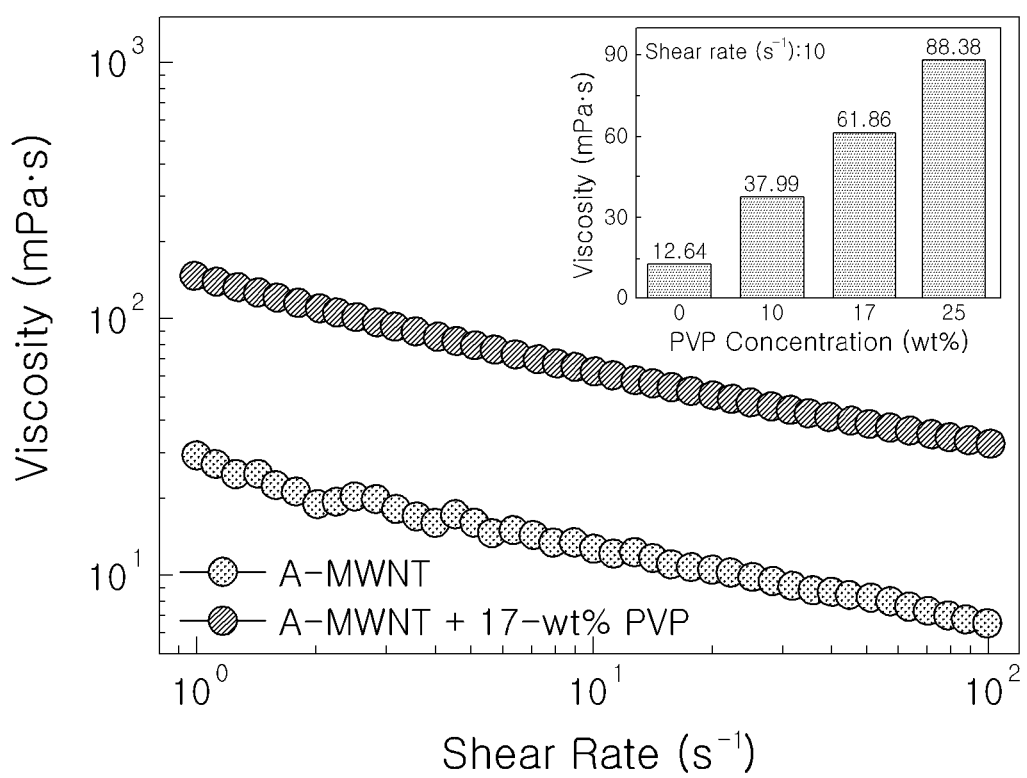
FIG. 6A and FIG. 6B are graphs illustrating a measurement result of a flow characteristic of an ink prepared according to the exemplary embodiment of the present invention.
Figure 6B:
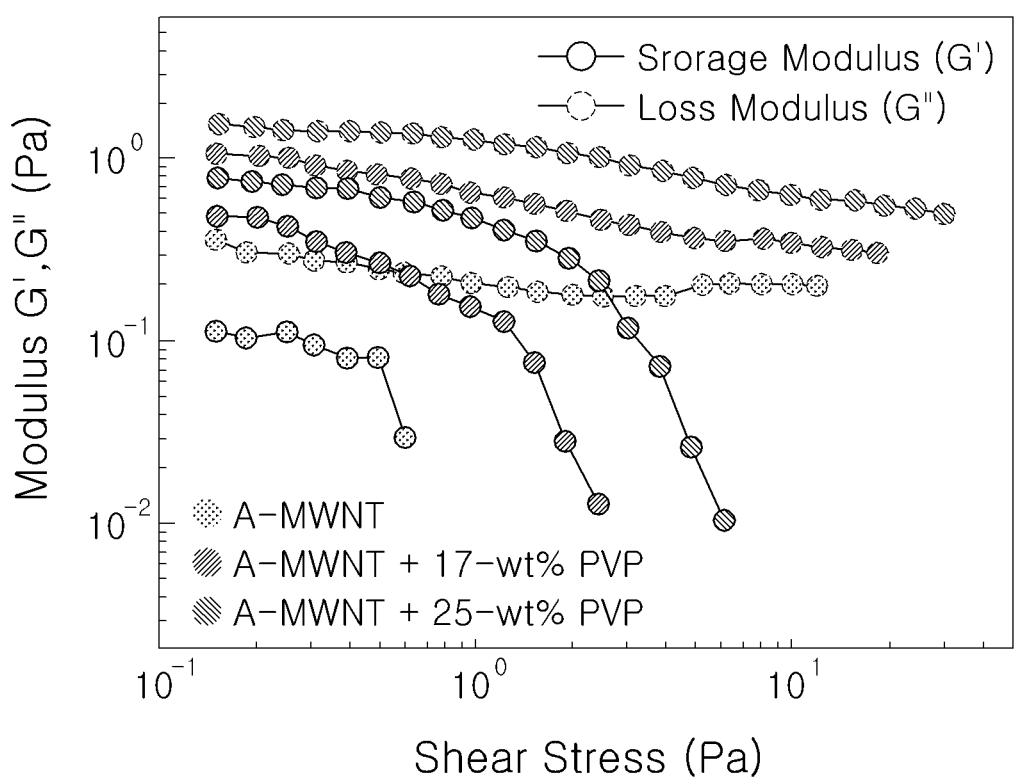

FIG. 6A and FIG. 6B are graphs illustrating a measurement result of a flow characteristic of the ink prepared according to the exemplary embodiment of the present invention.

First, FIG. 6A is a graph illustrating a change in viscosity according to a shear rate. As illustrated, both the ink (A-MWNT) including MWNT of 7 wt % and the ink including MWNT of 7 wt % and PVP of 17 wt % represent a shear thinning characteristic that viscosity is decreased according to an increase in a shear rate. Further, in the illustrated shear speed section, the ink represents low viscosity of 2 Pa·s or less. Further, in the present invention, when a content of PVP is further increased, for example, 25 wt % or more, viscosity may have a value of 5 Pa·s or less.

In the meantime, a small graph illustrated at an inner side of FIG. 6A shows that viscosity is increased according to an increase of a PVP concentration (wt %).

Next, FIG. 6B illustrates a change in a storage modulus (G') and a loss modulus (G") according to shear stress.

Referring to FIG. 6B, loss moduli (G") of all of the ink have larger values than those of storage moduli (G') in the shear stress section ($10^{-1}$ Pa to 10 Pa) to the concentration of PVP of 25 wt %. This shows that the ink of the present invention has a liquid-like behavior in this section. Further, a value of the storage modulus is not illustrated in a high shear stress section, but the storage modulus tends to be decreased according to an increase in the shear stress based on the tendency of the graph, so that the ink of the present invention may be expected to have a liquid-like behavior even in the section of 10 Pa or more.

As described above, by using the ink having the liquid-like behavior, the present invention does not need to use a pressure scheme, so that it is possible to improve space resolution of a 3D structure that may be manufactured. For example, it is possible to implement a 3D structure having a width of less than 10 μm, and further, it is possible to implement a 3D pattern having a width of less than 5 μm or a 3D pattern having a width of sub micrometer.

Figure 7:
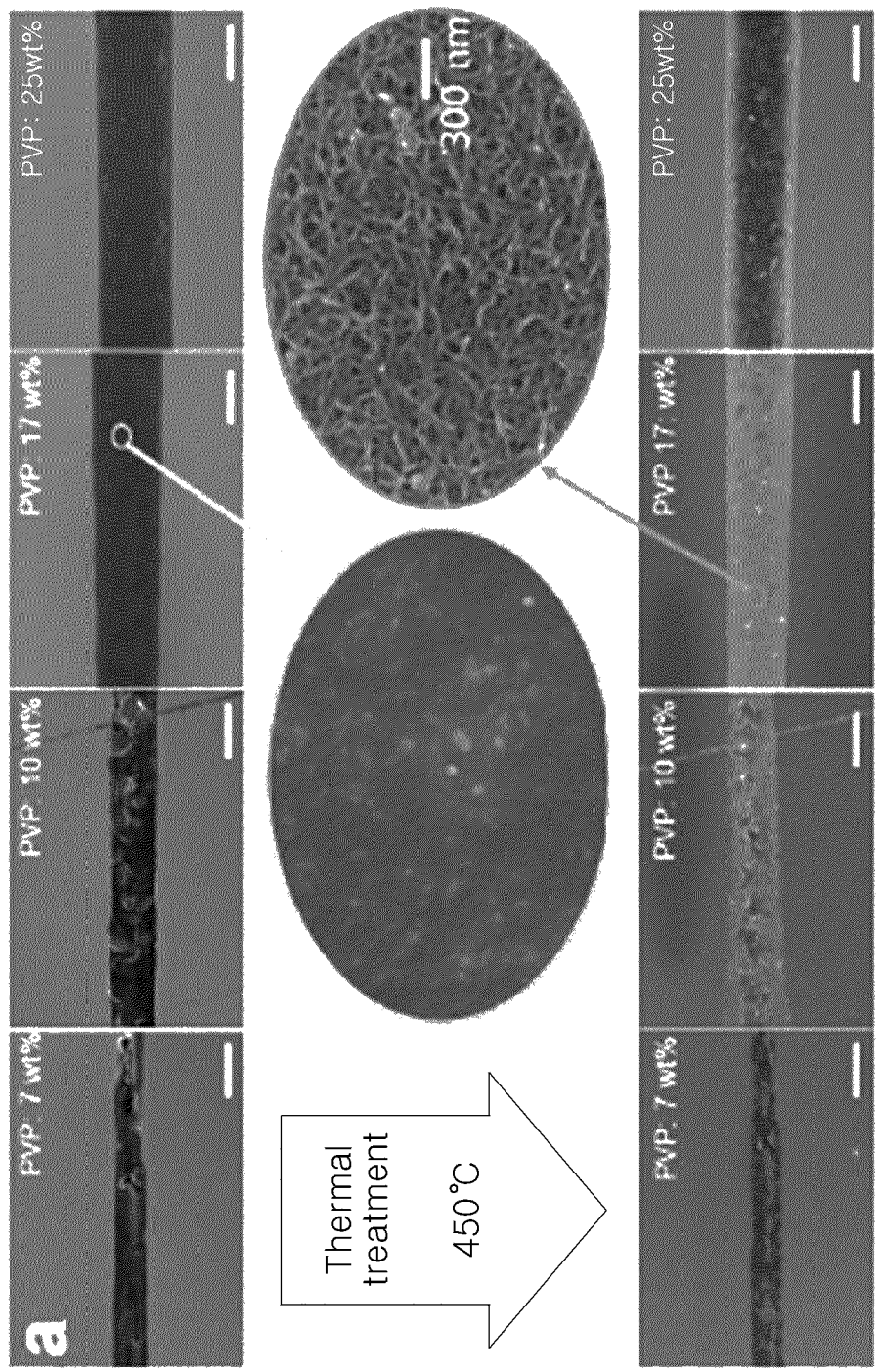
FIG. 7 is a graph illustrating a result of a test of printing performance of the ink prepared according to the exemplary embodiment of the present invention.

FIG. 7 is a picture illustrating a result of a test of printing performance of the ink prepared according to the exemplary embodiment of the present invention.

A 2D wire was formed on a Pt coated Si substrate by using ink of MWNT 7 wt %+PVP (each of 0 wt %, 7 wt %, 17 wt %, and 25 wt %). In this case, a width (Ws) of the wire was set to 24 μm, and a wire was formed at a pulling speed (v) of 75 $mm^{-1}$ in a pressureless state by using a nozzle having a diameter of 20 μm. Next, the formed wire was heat treated in a vacuum atmosphere of 450° C. for 1 hour.

Upper pictures FIG. 7 are pictures of a wire pattern before the heat treatment. In the pictures, a size of a scale bar corresponds to 20 μm. As can be seen from the drawing, in the case of the ink having the centration of PVP of 17 wt % and 25 wt %, the uniform wire having a width of 24 μm was obtained, and it is shown that the ink is capable of continuously flowing without interruption in the nozzle at this concentration. However, in the case of the ink having the concentration of PVP of less than 17 wt %, the discontinuous and non-uniform wire pattern was formed.

Lower pictures of FIG. 7 are pictures of the wire pattern after the heat treatment. The upper and lower pictures illustrated in FIG. 7 show that the PVP is removed by the heat treatment, so that the MWNT is mainly left in the wire pattern.

Figure 8:
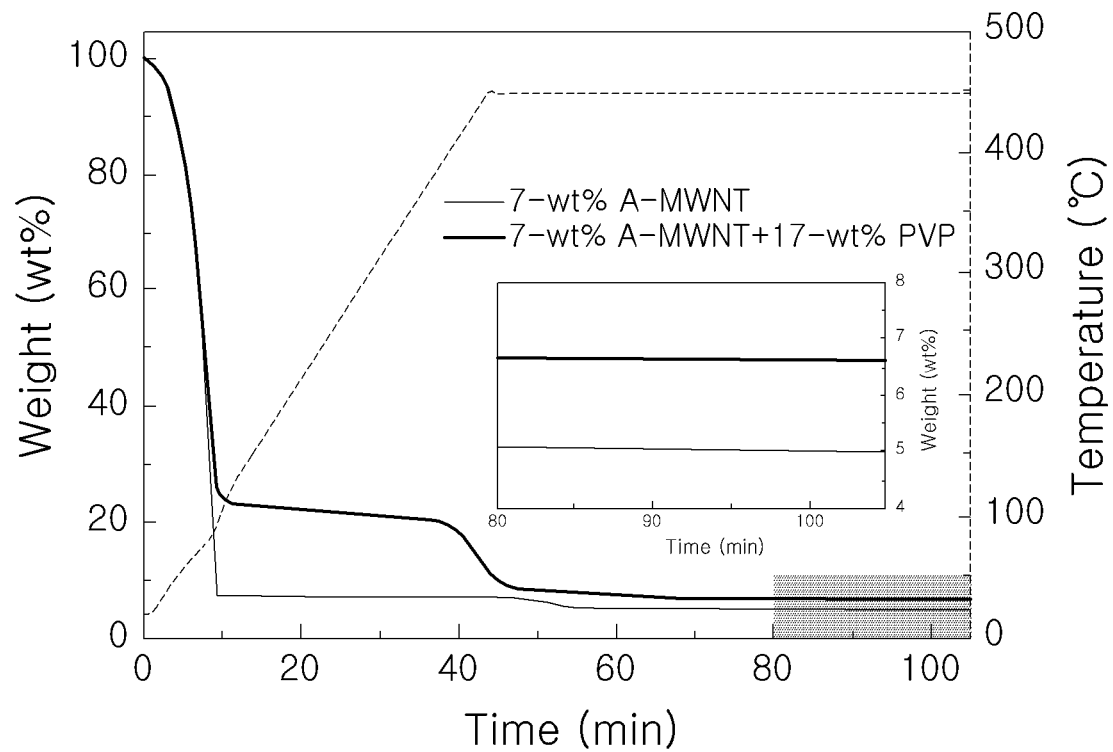
FIG. 8 is a graph illustrating a result of a thermo gravimetric analysis of the ink prepared according to the exemplary embodiment of the present invention.

FIG. 8 is a graph illustrating a result of a thermo gravimetric analysis of the ink prepared according to the exemplary embodiment of the present invention.

The thermo gravimetric analysis was performed on the MWNT 7 wt % sample (7-wt % A-MWNT) and the MWNT 7 wt %+17 wt % PVP sample (7-wt % A-MWNT+17-wt % PVP). In the result of the thermo gravimetric analysis of each sample, a decrease in weight at a temperature around 100° C. is caused by the evaporation of a solvent, and a decrease in weight at a temperature of 400° C. or more is mostly caused by the resolution of the PVP. As a matter of course, even in the case of the MWNT 7 wt % sample, a decrease in weight is observed at a high temperature, and this is estimated to be caused by the resolution of the MWNT.

The final weight of the MWNT 7 wt % sample was about 5 wt %, and the final weight of the MWNT 7 wt %+17 wt % PVP sample was about 6.6 wt %. Accordingly, the content of the MWNT within the MWNT 7 wt %+17 wt % PVP sample is the same as the content of the MWNT 7 wt % sample, so that it can be seen that the sample generates a structure formed of MWNT 75 wt %+PVP 25 wt % by the heat treatment. Accordingly, the MWNT structure prepared by the ink of the present invention uses the MWNT as a main component, so that it is possible to fully utilize an electric and mechanical characteristic of the MWNT.

In the meantime, it is shown that in the present invention, the structure after the PVP removal operation uses the MWNT as a main component and is capable of firmly maintaining a shape by van der Waals bonding between the MWNT, and does not exhibit a re-soluble property to water.

<Prepare CNT Composite Material Structure>

A CNT composite material structure was prepared by using ink including 7 wt % of MWNT and 17 wt % of PVP. As a nozzle, a glass micro-nozzle was used, and an aperture of the nozzle was various from 8 μm to 30 μm. As described in relation to FIGS. 1 to 3, the CNT ink was supplied to a rear side of the micro-nozzle and was extruded from a leading end of a nozzle without an addition of other pressure, other than capillary force.

By using the device illustrated in FIG. 4, a position and a pulling speed of the micro-nozzle in a pattern manufacturing process are precisely controlled with position precision of 250 nm by using a 3-axis stepping motor, and a growth process of a fine structure was photographed in-situ by using a high-definition monitoring system including an optical lens of 200 magnification and a charge-coupled device (CCD) camera.

A printed MWNT structure was heat treated in vacuum at 450° C. for 1 hour.

As illustrated in FIG. 9A to FIG. 9D, various structures are implemented according to the method of the present invention.

Figure 9A:
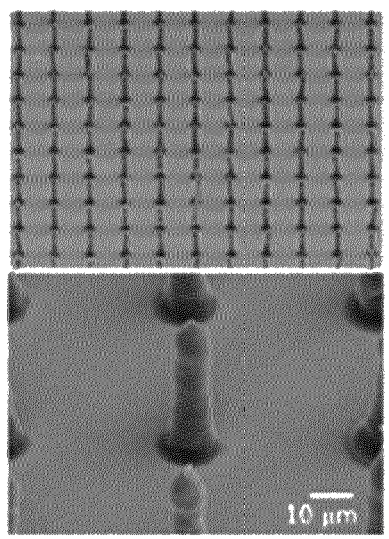
FIG. 9A to FIG. 9D are pictures illustrating various structures implemented according to the exemplary embodiment of the present invention.

FIG. 9A illustrates a disposition of free-standing MWNT columns having a diameter of about 9 μm and a gap of 30 μm. The illustrated structure was formed by pulling a micro-nozzle in a vertical direction at a speed (u) of 20 $\mu ms^{-1}$.

Figure 9B:
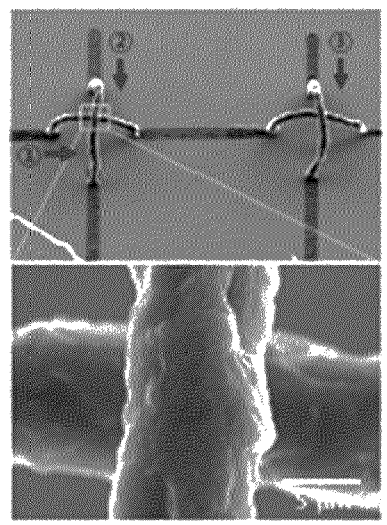
Figure 9C:
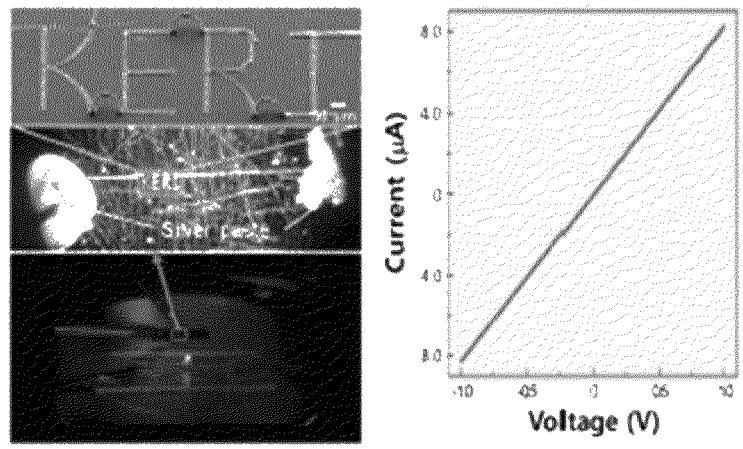

FIG. 9B illustrates a bridge structure, and FIG. 9C illustrates a structure, in which letter "KERI" is connected by a bridge. A right graph of FIG. 9C shows an ohmic contact between the letter "KERI" pattern and a silver electrode (silver paste). The "KERI" pattern represents electric conductivity of about 2,540 $Sm^{-1}$ at a room temperature. The electric conductivity of 2,540 $Sm^{-1}$ is a value far higher than conductivity of the previously reported 3D-printed CNT structure.

Figure 9D:
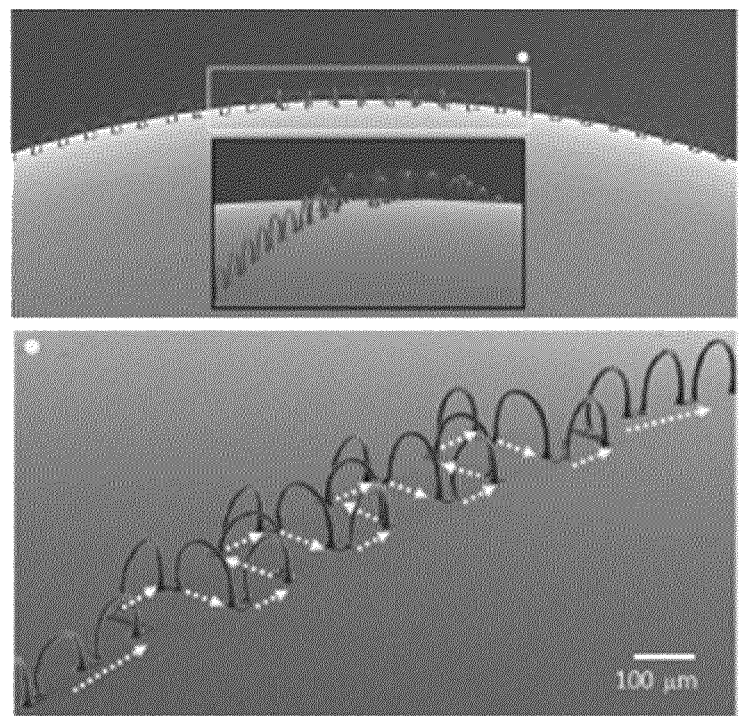

FIG. 9D illustrates a continued MWNT bridge structure implemented on a curve glass substrate having a radius of curvature of about 8.4 mm. This exemplary embodiment shows that the present invention may be implemented in a non-flat surface, such as a curved surface.

Figure 10A:
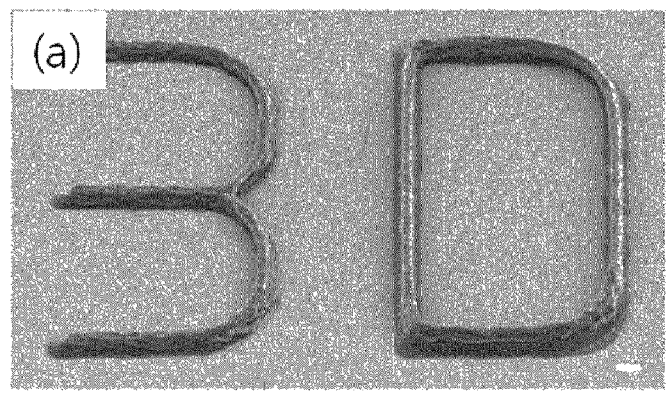
FIG. 10A to FIG. 10C are diagrams illustrating an example of a 3D structure according to another exemplary embodiment of the present invention.
Figure 10B:
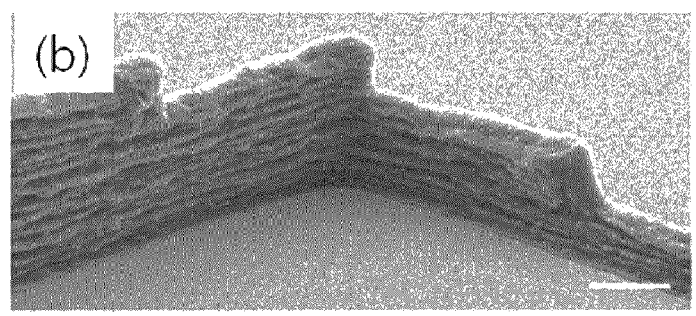
Figure 10C:
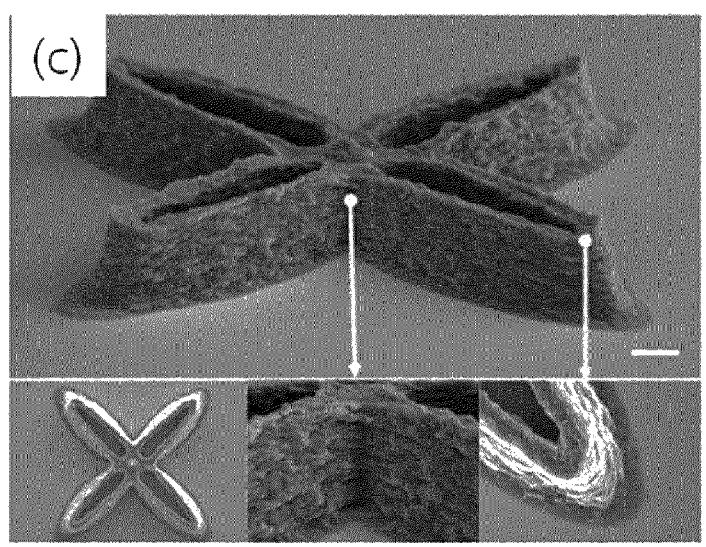

FIG. 10A to FIG. 10C are diagrams illustrating an example of a 3D structure according to another exemplary embodiment of the present invention.

Referring to FIG. 10A to FIG. 10C, structures of a 3D wall structure having various shapes are illustrated. As described above, it is possible to implement the 3D structure having various shapes including a step-shape wall structure and a hollow structure.

<Manufacture Functional Element>

Figure 11A:
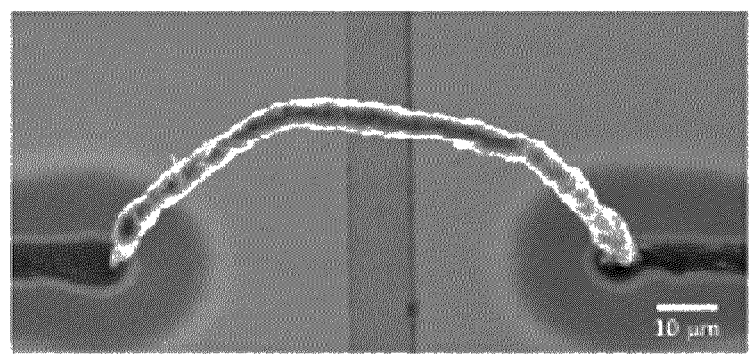
FIG. 11A to FIG. 11H are pictures illustrating a functional device implemented according to the exemplary embodiment of the present invention.
Figure 11B:
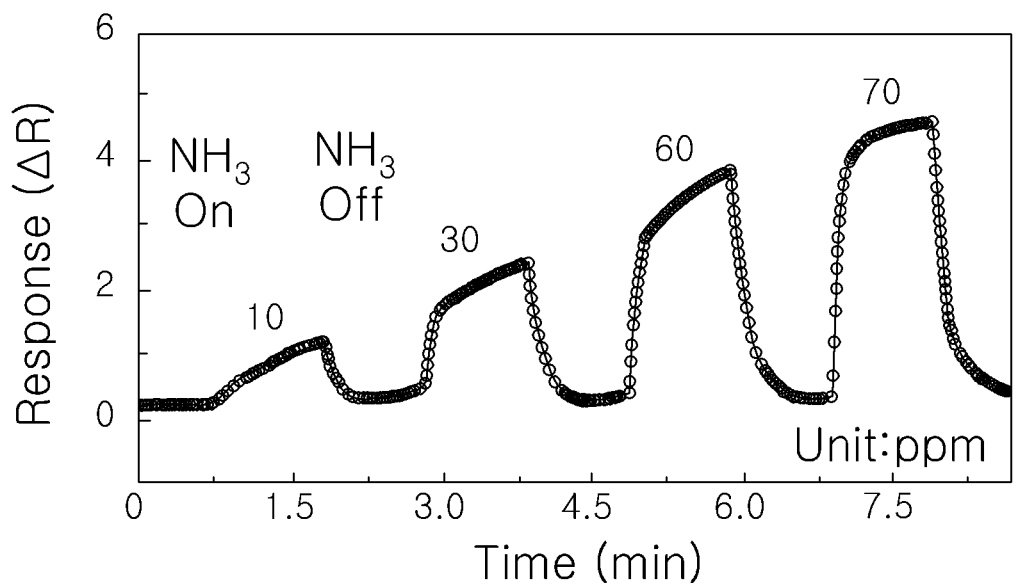

As illustrated in FIG. 11A, a manufactured sensor was tested by printing a fine bridge, which has a width of an MWNT of about 5 μm, between Pt-coated SI electrodes having a gap of 10 μm, at a room temperature. A lead (Pb) wire was attached to the two electrodes by using a silver paste, and was electrically connected with a measurement system. The sensor was disposed within a manually manufactured chamber including an inlet pipe and an outlet pipe for gas flow. Flow rates of nitrogen gas and ammonia gas having purity of 99.999% were controlled by using a flow controller (ATOVAC AFC500). A concentration of $NH_3$ was maintained between 10 to 70 ppm by controlling a ratio of NH$_3$/N$_2$. Pure N$_2$ was used for purge for restoring sensor resistance to a reference condition (Ro). Electric resistance of the sensor was measured with a bias voltage of 1 V by using a semiconductor analysis system (Keithley 4200-SCS). When NH$_3$ is adsorbed to the MWNT, a hall concentration is decreased, which increases electric resistance of the MWNT bridge structure. FIG. 11B represents a reaction of an MWNT bridge transducer when a concentration of NH$_3$ is increased from 10 ppm to 70 ppm.

Figure 11C:
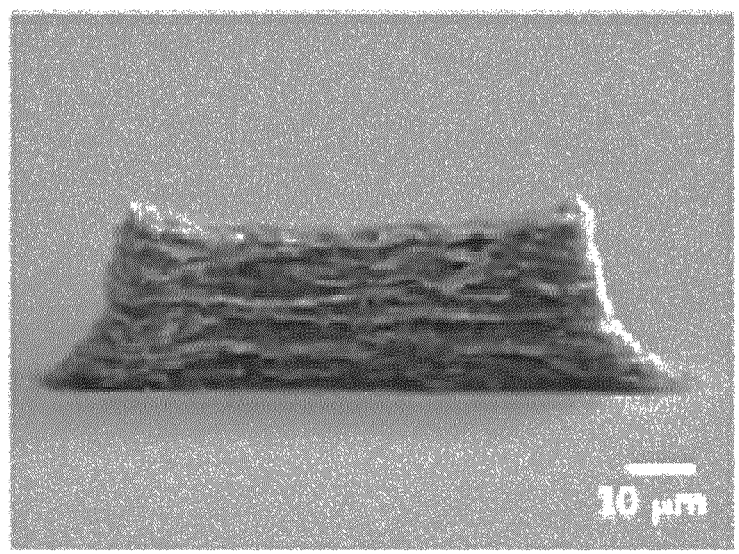
Figure 11D:
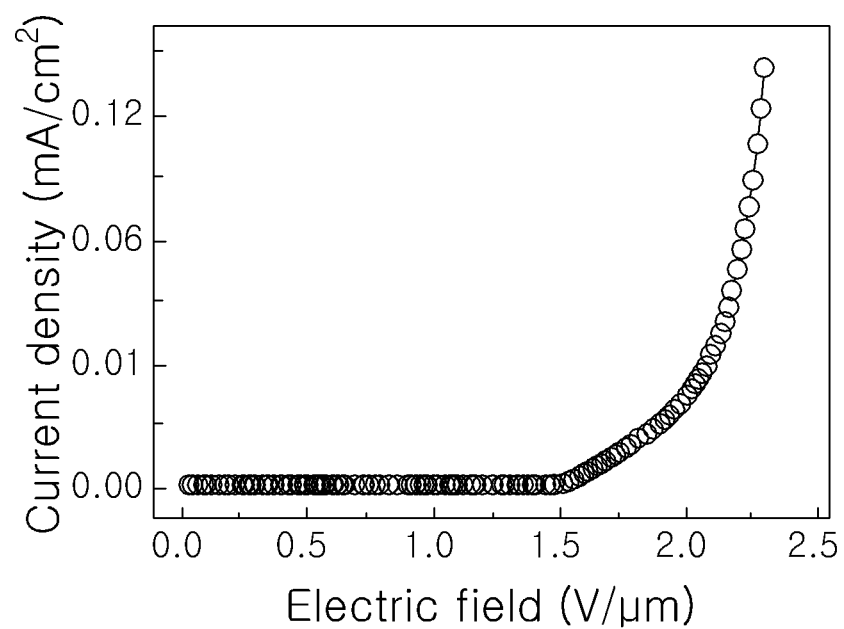
Figure 11E:
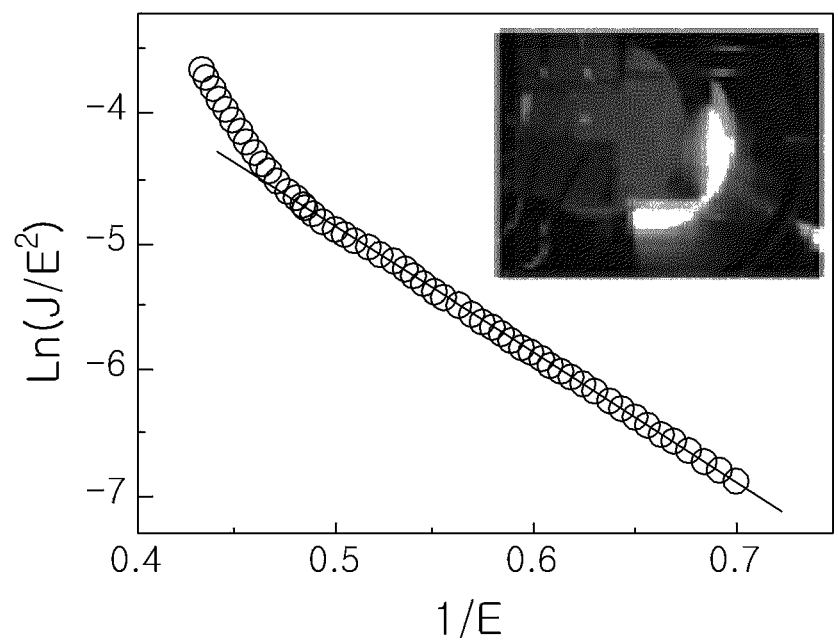

As illustrated in FIG. 11C, an MWNT wall structure was prepared for an application as an electron emission device. The emission of electrons of the 3D MWNT wall structure was performed in a diode type system, in which a DC bias is embedded in a vacuum chamber. In this case, a base pressure was maintained at 5×10$^{-7}$ torr. The 3D MWNT wall structure as an emitter was printed on ITO glass, and the ITO glass having a thickness of 500 mm and a phosphorus (P)-coated glass substrate were used as a spacer and a negative electrode, respectively. FIG. 11D is a graph illustrating a J-E characteristic of the MWNT wall structure, and FIG. 11E is a graph illustrating the Fowler-Nordheim plot.

Figure 11F:
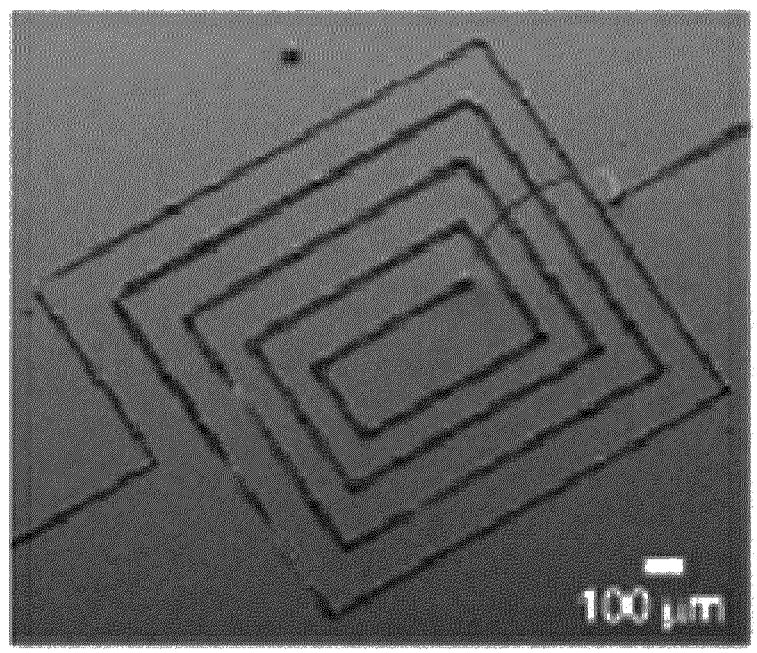
Figure 11G:
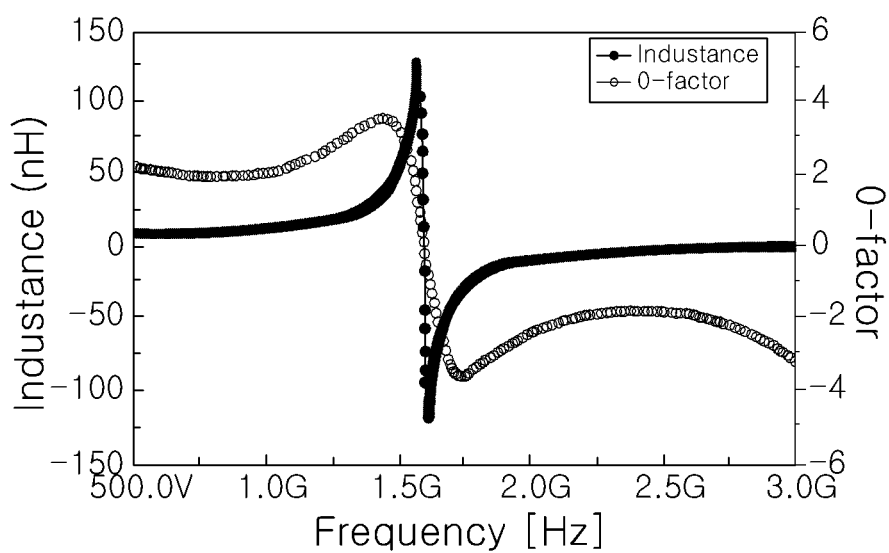
Figure 11H:
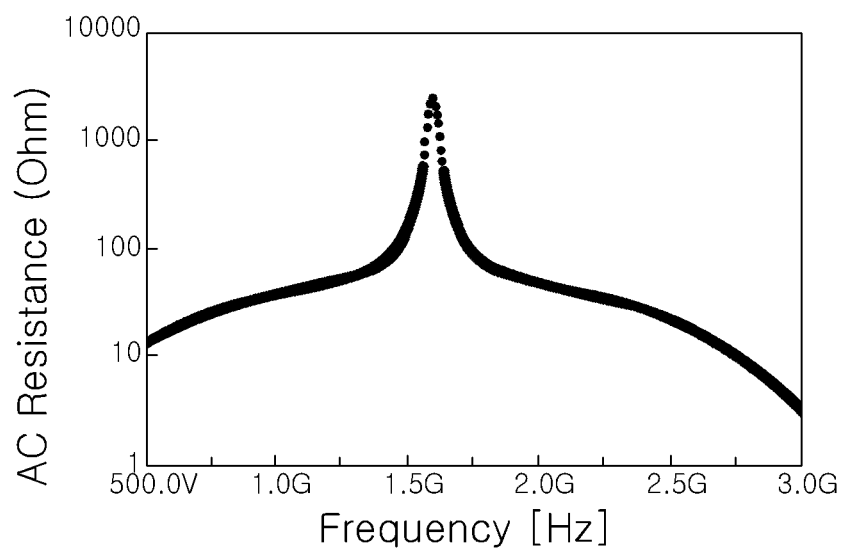

FIG. 11F is an RF inductor device, and a 2D transmission line and a connection wire having a 3D bridge structure were implemented on a glass substrate. FIG. 11G and FIG. 11H are graphs illustrating measurement results of inductance, a Q-factor, and AC resistance of the implemented inductor device, respectively.

Figure 12:
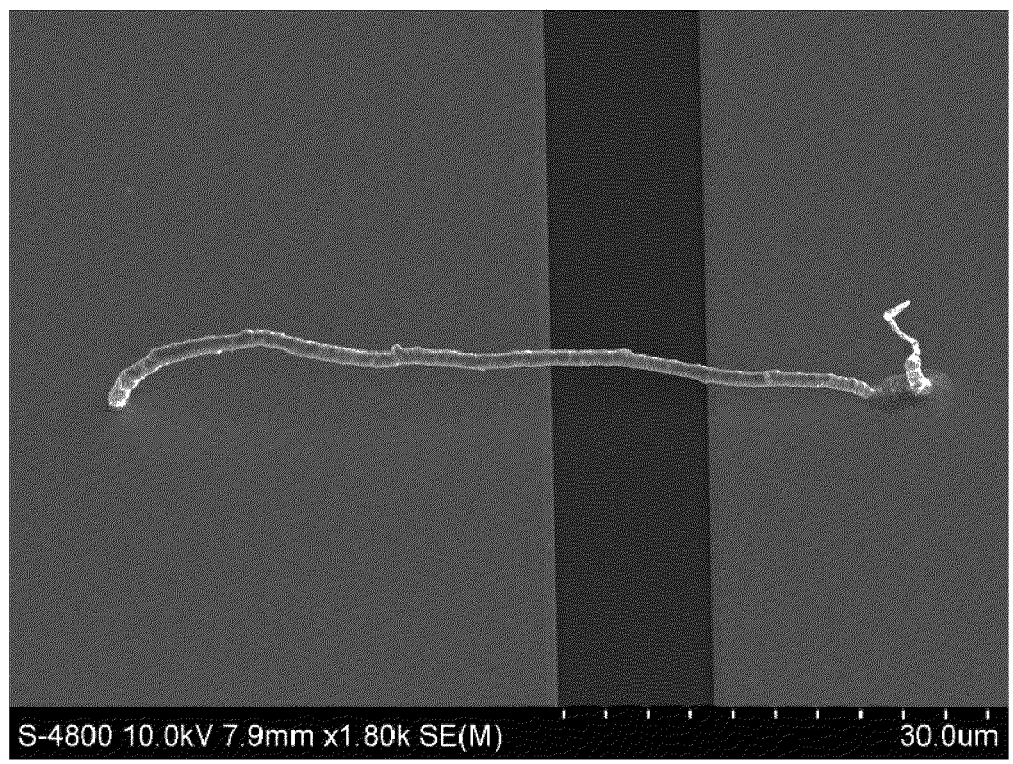
FIG. 12 is a picture illustrating a functional device implemented according to another exemplary embodiment of the present invention.

FIG. 12 is a picture illustrating a bridge pattern prepared according to another exemplary embodiment of the present invention. As illustrated in FIG. 12, it is possible to implement a fine bridge having a pattern width of about 1 μm.

INDUSTRIAL APPLICABILITY

The present invention is applicable to a printed electronic technology of a wire of a PCB substrate and the like or a 3D printing technology for implementing an electronic device, such as an active device and a passive device.

The invention claimed is:

1. A method of manufacturing a carbon nanotube (CNT) composite material structure, the method comprising:
    providing ink, in which a CNT composite material including a CNT and a rheological modifier is dispersed in a solvent, to a nozzle;
    positioning the nozzle at a predetermined point on a substrate; and
    moving the nozzle along a predetermined path on the substrate while discharging the ink from the nozzle by pressureless extrusion and without interruption by surface tension of a meniscus of the ink formed at a leading end of the nozzle and printing a CNT composite material pattern corresponding to a movement path of the nozzle,
    wherein in the printing of the CNT composite material pattern, the CNT composite material formed by evaporation of the solvent within the meniscus of the ink is extruded from the nozzle between the nozzle and the substrate and stacked, and
    wherein a loss modulus of the ink has a larger value than a storage modulus of the ink under shear stress of $10^{-1}$ Pa to 10 Pa.

2. The method of claim 1, wherein the rheological modifier forms a hydrophilic ring surrounding a surface of the CNT.

3. The method of claim 1, wherein a concentration of the CNT composite material in the ink is 6 to 60 wt %.

4. The method of claim 3, wherein a concentration of the CNT in the ink is 1 to 20 wt %.

5. The method of claim 3, wherein a concentration of the rheological modifier in the ink is 5 to 40 wt %.

6. The method of claim 1, wherein a concentration of the CNT composite material in the ink is 22 to 35 wt %.

7. The method of claim 1, wherein the rheological modifier is a hydrophilic polymer.

8. The method of claim 7, wherein the hydrophilic polymer includes at least one kind of polymer selected from the group consisting of polyvinyl pyrrolidone (PVP), polyacrylic acid (PAA), and polyethylene glycol (PEG).

9. The method of claim 1, further comprising: removing at least a part of the rheological modifier in the CNT composite material pattern after the printing.

10. The method of claim 9, wherein a content of the CNT in the CNT composite material pattern after the removal is 50 wt % or more.

11. The method of claim 9, wherein a content of the CNT in the CNT composite material pattern after the removal is 70 wt % or more.

12. The method of claim 11, wherein a width of the CNT composite material pattern is less than 10 μm.

13. The method of claim 11, wherein a width of the CNT composite material pattern is less than 5 μm.

14. The method of claim 1, wherein the solvent is at least one kind selected from the polar solvent group consisting of water, alcohol, acetone, and dichloromethane.

* * * * *